UNITED STATES PATENT OFFICE.

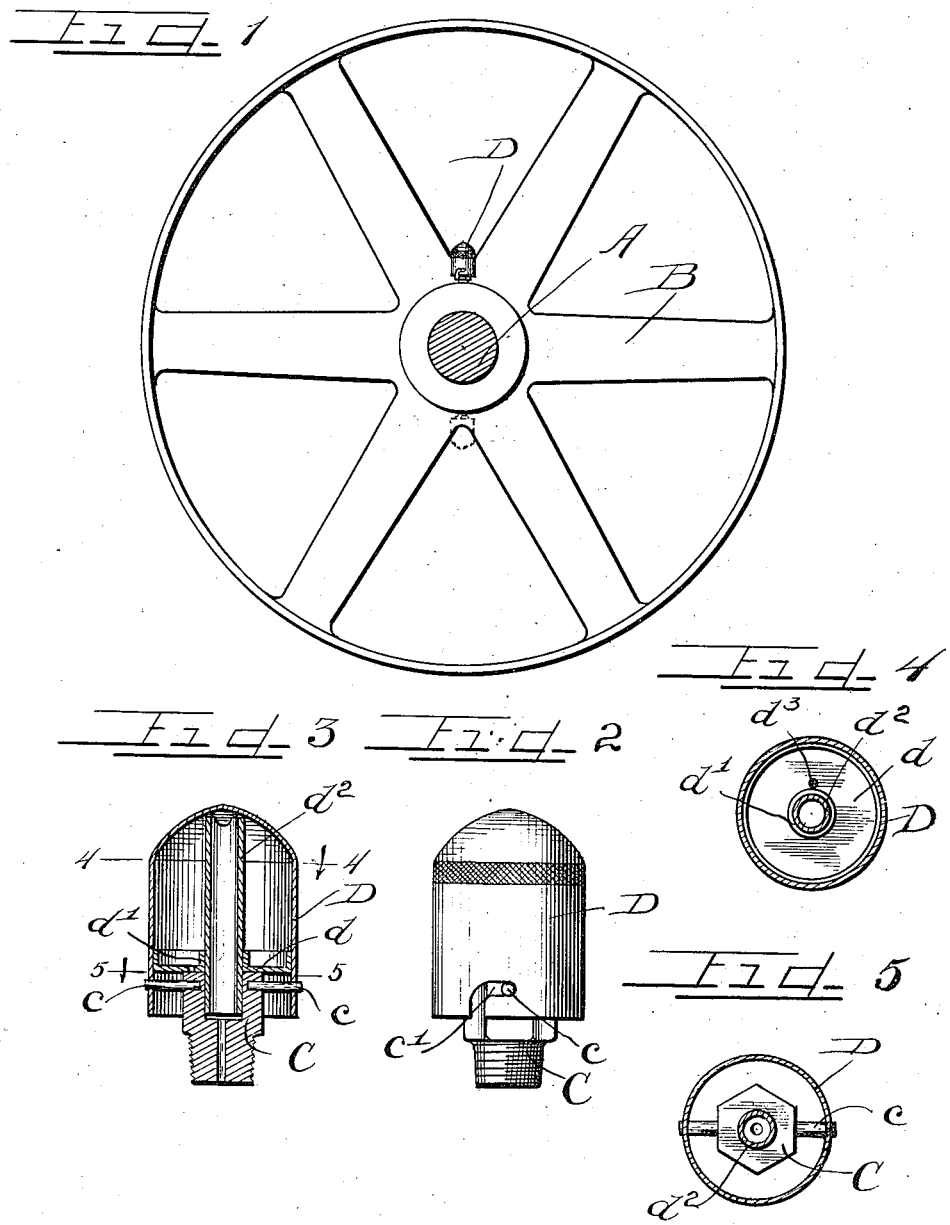

JOHN B. REIMUND AND JOSEPH W. KYLE, OF CHICAGO, ILLINOIS; SAID KYLE ASSIGNOR TO SAID REIMUND.

OIL-CUP.

No. 863,878.  Specification of Letters Patent.  Patented Aug. 20, 1907.

Application filed May 7, 1906. Serial No. 315,682.

*To all whom it may concern:*

Be it known that we, JOHN B. REIMUND and JOSEPH W. KYLE, citizens of the United States, and residents of the city of Chicago, in the county of Cook and State of Illinois, have invented certain new and useful Improvements in Oil-Cups; and we do hereby declare that the following is a full, clear, and exact description of the same, reference being had to the accompanying drawings, and to the letters of reference marked thereon, which form a part of this specification.

This invention relates to improvements in oil cups of that class adapted for attachment to a rotative element such as a loose pulley.

Various devices have been employed to lubricate loose pulleys, idler pulleys and the like and though these have been more or less successful for the purpose for which designed they have sometimes been subject to serious defects. The cups have been difficult to fill. It has been impossible to sufficiently lubricate the bearing owing to the centrifugal tendency of the oil in the cup. It has been difficult to regulate the feed from the cup inasmuch as the oil or lubricant becomes somewhat more fluid even under a slight increase in temperature due to the operation of the pulley and in consequence the feed has usually been somewhat irregular.

The object of this invention is to provide an oiler of the class described in which the cup can be easily filled independently of the position of the wheel and in which the feed of the oil is effected mainly at the intervals when the pulley is at rest.

It is also an object of the invention to afford a construction in which the centrifugal tendency of the lubricant insures the delivery to the bearing of a charge of the lubricant when the pulley or element carrying the lubricating cup comes to rest.

It is further an object of the invention to provide a cheap simple and durable construction not likely to get out of repair.

The invention consists in the matters hereinafter described and more fully pointed out and defined in the appended claims.

In the drawings: Figure 1 is a side elevation of a loose pulley provided with an oil cup embodying my invention. Fig. 2 is a side elevation of the oil cup. Fig. 3 is a central vertical section of the same. Fig. 4 is a section taken on line 4—4 of Fig. 3. Fig. 5 is a section taken on line 5—5 of Fig. 3.

As shown in said drawings: A indicates the shaft and B a loose pulley or any rotative element on said shaft. Secured in the hub of said pulley and opening therethrough to the shaft A, is the lubricator cup D. This as shown comprises a tubular nipple C, threaded at its lower end to engage in the oil aperture in said hub which is also threaded and its upper end, in which is an axial bore of larger size, is angular to permit engagement by a wrench and secured on opposite sides thereof are oppositely directed, alined pins or arms $c$. Secured on said nipple is the cup proper. This comprises a cylindric, metallic shell D conically tapered and closed at its upper end and constructed as shown of pressed steel or other suitable material. Pressed or otherwise secured in said cup to afford a tight joint is a peripherally flanged plate $d$ which affords the bottom and is provided with a central aperture therethrough surrounded by a peripheral flange $d'$ and through which extends a tube $d^2$ of considerable size. Said tube is of a length to extend to the top of the cup and to project through the bottom $d$, thereof a distance equal to the depth of the larger bore in the nipple C. Said tube $d^2$, is notched at its upper end to communicate with the interior of the cup near the apex of the conical top. Said cup is provided in its margin which extends below the bottom $d$ with oppositely disposed notches $c'$ in the manner of lamp sockets to receive the pins or arms $c$ as shown in Figs. 2 and 3 so that said cup when forced downwardly over the nipple by slight rotations thereon is rigidly secured in place. As shown a small vent aperture $d^3$ is provided in the bottom plate $d$ of the cup in position to be covered by the top of the nipple C when said cup is secured in place.

The operation is as follows: The nipple is secured in the hub as before described and the cup is removed and inverted and the desired quantity of oil or lubricant is poured therein through the tube $d^2$ the air being displaced from said cup through the vent hole in the bottom. The cup can thus be very easily filled and its contents cannot spill. When inserted over the nipple, with the end of the tube $d^2$ inserted in the larger bore in said nipple, a slight rotation of the cup thereon secures the same firmly in place. When the pulley is brought into operation the centrifugal tendency caused by the rotation thereof throws the lubricant to the apex of the cup forcing the same into and filling the tube and carrying a small quantity thereof through the passage in the nipple to the bearing. However the principal lubricating action is preferably secured by relying upon the lubrication ensuing after the wheel has stopped its rotation. For this purpose one or more of said cups may be secured on the same wheel hub diametrically opposite from each other. In consequence one or the other of said cups is certain to lie above the axis of the shaft when the wheel comes to rest and as a result the lubricant contained in the cup flows outwardly from the tube $d^2$ to the bearing. The quantity thus delivered as well as the rate of discharge may be varied by varying the bore through the nipple.

Of course it is not essential that two cups be employed on the same hub as evidently one may be employed. In that event the wheel if properly balanced will usually stop with the cup above its axis in consequence any lubricant in said tube flows down to the journal.

Obviously details of construction may be varied without departing from the principles of my invention.

We claim as our invention:

1. A centrifugally operated oil cup embracing a cup having a closed bottom, a tube inserted therethrough and extending into the top of the cup and projecting through said bottom, a detachable cored nipple engaged to said cup and adapted to receive the end of said tube and having a restricted passage connecting the tube and bearing.

2. A centrifugally operated oil cup comprising a shell, conically tapered at its top, a substantially closed bottom in the shell but having a vent hole therein, there being oppositely disposed notches in the lower periphery of said cup, a tubular nipple connected in the oil hole in the element to be lubricated, oppositely disposed pins projecting from said nipple adapted to be inserted in the slots of the shell to lock the same to the nipple, a pipe extending from the top of the cup into the nipple and having notches in the upper end thereof.

3. A centrifugally operated oil cup embracing a pressed notched metal shell, a reduced top thereon, a plate engaged in said shell near the lower end thereof, having peripheral upturned flanges and having a vent aperture therethrough, a tube extending to the top of said shell and projecting through its bottom and having notches therein at its top, and a tubular nipple in the bearing and detachably engaging the cup and closing the vent in said plate.

4. In a centrifugally operating oil cup, a pipe extending axially to the top of the cup having notches in the upper extremity thereof and receiving a charge of oil centrifugally and acting to discharge to the bearing, a detachable tubular nipple engaged to said cup cored in the upper end to receive the lower end of said pipe and having a restricted passage connecting said pipe with the bearing and adapted to deliver oil to the bearing when at rest.

5. In a device of the class described a cup having a conical upper end, a partition in said cup near the lower end thereof having a central aperture therethrough, there being oppositely disposed notches in the periphery of said cup below said partition, a nipple having an enlarged bore at its upper end and a passage opening through the same, pins engaged thereto adapted to fit in the notches in said cup and a pipe extending through the central aperture in said partition and extending upwardly to the top of said cup and downwardly into the bore in said nipple.

6. In a device of the class described the combination with a cup of a partition therein near the lower end thereof and having a central aperture therethrough, a pipe in said cup bearing against the top of the same and extending through said partition and having its upper end notched, a nipple, means engaging the same to the cup, said nipple having a passage connecting said pipe with the bearing and said partition having an air vent adapted to release the air from said cup when filling.

7. In a centrifugally operated oil cup the combination with a nipple adapted to be engaged to the article to be lubricated, of an oil cup adapted to be attached to or detached from said nipple when the same is engaged in place said cup provided with an air vent which is closed by said nipple when in place.

8. In a device of the class described the combination with a nipple, pins engaged to and projecting outwardly from said nipple, of an oil cup having its lower edge notched on diametrically opposite sides and adapted to be engaged to the nipple or removed therefrom when the same is in place and a tube extending from the top of the cup downwardly beyond the top of the nipple and seated therein.

9. In a device of the class described the combination with a cored nipple, pins engaged thereto, of an oil cup detachably engaged on said nipple by the pins and a tube extending to the top of the cup and seated in said nipple below its top, said nipple having a passage therethrough.

10. In a device of the class described the combination with a nipple having a recess in its upper end of a detachable cup having a bottom provided with an aperture therethrough, a tube in said cup projecting through said aperture and seated in the recessed nipple, and said cup having an air vent for the escape of air when filling the same and closed by the nipple when the cup is in place.

11. In a device of the class described the combination with a cored nipple, of an oil cup detachably engaged with the nipple and having a bottom provided with an aperture therethrough, and a tube in said oil cup projecting beyond the bottom of said cup and seated in the cored nipple, said nipple normally closing means adapted to release the air from said cup when filling.

In testimony whereof we have hereunto subscribed our names in the presence of two subscribing witnesses.

JOHN B. REIMUND.
JOSEPH W. KYLE.

Witnesses:
W. W. WITHENBURY,
WM. C. SMITH.

---

It is hereby certified that Letters Patent No. 863,878, granted August 20, 1907, upon the application of John B. Reimund and Joseph W. Kyle, of Chicago, Illinois, for an improvement in "Oil-Cups," were erroneously issued to "said John B. Reimund" as sole owner of said invention; whereas said Letters Patent should have been issued to *John B. Reimund and George W. Reimund, jointly*, said George W. Reimund being the assignee of the entire interest of said Kyle, as shown by the record of assignments in this office; and that the said Letters Patent should be read with this correction therein that the same may conform to the record of the case in the Patent Office.

Signed and sealed this 15th day of October, A. D., 1907.

[SEAL.]

EDWARD B. MOORE,
*Commissioner of Patents.*